(12) United States Patent
Shishido et al.

(10) Patent No.: US 7,097,814 B2
(45) Date of Patent: Aug. 29, 2006

(54) WASTE GAS TREATING DEVICE HAVING FLOW REGULATING ASSEMBLY

(75) Inventors: Satoru Shishido, Kure (JP); Katsuhiro Yashiro, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 363 days.

(21) Appl. No.: 10/333,200

(22) PCT Filed: Jul. 27, 2001

(86) PCT No.: PCT/JP01/06489

§ 371 (c)(1),
(2), (4) Date: May 8, 2003

(87) PCT Pub. No.: WO02/09854

PCT Pub. Date: Feb. 7, 2002

(65) Prior Publication Data

US 2003/0175175 A1    Sep. 18, 2003

(30) Foreign Application Priority Data

Jul. 28, 2000    (JP) .............................. 2000-229618

(51) Int. Cl.
*F01N 3/08*    (2006.01)
(52) U.S. Cl. ..................... 422/176; 422/177

(58) Field of Classification Search ................ 422/176, 422/177, 220, 222; 60/299
See application file for complete search history.

(56) References Cited

U.S. PATENT DOCUMENTS 5,043,146 A * 8/1991 Ishikawa et al. ............ 422/176

* cited by examiner

*Primary Examiner*—Glenn Caldarola
*Assistant Examiner*—Tom P. Duong
(74) *Attorney, Agent, or Firm*—Fay, Sharpe, Fagan, Minnich & McKee, LLP

(57) ABSTRACT

An apparatus for treating an exhaust gas comprising:
(a) an inlet duct through which the exhaust gas is flowed in,
(b) a bend portion, and
(c) a catalyst duct connected to the inlet duct through the bend portion, and having a catalyst for purifying the exhaust gas and disposed in the catalyst duct,
a baffle structure comprising plural baffle plates disposed at the inlet of the catalyst duct in the direction of the cross section of the catalyst duct,
wherein the plural baffle plates are formed and arranged so that the heights of the baffle plates gradually increase in the direction from the side of the inlet duct toward the extremity of the bend portion to make the flow distribution of the exhaust gas uniform in the direction of the cross section of the catalyst duct at the outlets of the exhaust gas in the baffle structure.

2 Claims, 2 Drawing Sheets

WASTE GAS TREATING DEVICE HAVING FLOW REGULATING ASSEMBLY

TECHNICAL FIELD

The present invention relates to an apparatus having a baffle structure and used for treating an exhaust gas. More specifically, the present invention relates to an apparatus having a baffle structure by which the distribution of the gas flow rates at the inlet of a catalyst device is improved, and used for treating an exhaust gas, especially for denitrating an exhaust gas.

BACKGROUND ART

Heretofore, in large-sized boilers for thermal power plants, a large apparatus for treating an exhaust gas, such as a denitrating apparatus is installed. FIG. 3 illustrates a structure in the vicinity of a denitrating device installed in a duct for an exhaust gas generated from such a large-sized boiler (combustion apparatus). In this apparatus, inlet duct 1 through which exhaust gas G is flowed in and catalyst duct 6 in which denitrating catalyst layer 4 is disposed are connected through bend portion 2; and baffle structure 3 in which plural baffle plates 3A are arranged in the direction of the cross section of the duct is disposed at the inlet of catalyst duct 6. The arrows in FIG. 3 show the direction of the flow of a gas. In this apparatus, exhaust gas G reaches, through inlet duct 1, to bend portion 2 formed at a midway of a duct for an exhaust gas, changes there its flow direction by 90°, flows into catalyst layer 4 disposed in catalyst duct 6, and then reaches to outlet duct 5 after subjected to a denitration. In the structure as described above, however, there exists such a problem as the distribution of the gas flow rate at the inlet of catalyst device 6 becomes nonuniform as shown in FIG. 3.

As the result, it is desired or requested that (1) an exhaust gas flows into catalyst layer 4 as uniformly as possible and (2) the flow of an exhaust gas which flows into catalyst layer 4 and the flow of the exhaust gas in the catalyst layer 4 become the same as much as possible, namely, the pattern of the flow passages of an exhaust gas immediately prior to flowing into catalyst layer 4 agrees with the pattern of the flow passages of the exhaust gas, formed in the catalyst layer 4. These desires or requests are produced or made based on the following reasons:

That is, (1) the reason why the flowing of an exhaust gas into catalyst layer 4 is requested to be as uniform as possible is to efficiently use the area in which the exhaust gas contacts with the catalyst in the catalyst layer 4. If the flowing of the exhaust gas into the catalyst layer was not uniform, specific portions of the catalyst in the catalyst layer 4 contact with a large amount of the exhaust gas and thus the performances of the catalyst decrease as a whole. Besides, there exists such a problem as the portions of the catalyst which contact with a large amount of the exhaust gas remarkably deteriorate and thus the life of the catalyst becomes short as a whole.

Next, (2) the reason why the flow of an exhaust gas flowing into catalyst layer 4 is requested to agree with the flow of the exhaust gas in the catalyst layer 4 as much as possible is that, for instance, when dusts such as fly ashes and unburnt matters are contained in the exhaust gas, the exhaust gas sometimes obliquely flows into the exhaust gas flow passages formed among catalysts (catalyst plates) in the catalyst layer and thus (a) the dusts directly collide against the catalyst plates to wear their surfaces and (b) the dusts adhere to and deposit on the front portions of the catalyst layer to impede the flow of the exhaust gas into the flow passages.

In order to resolve the problems described in (1) and (2) above, a method in which baffle structure 3 such as a baffle lattice is disposed at the inlet of catalyst device 6 is proposed (Japanese Patent No. 2637119).

DISCLOSURE OF THE INVENTION

In the conventional technology described above, baffle structure 3 is located at the inlet of catalyst duct 6 and the level of the upper end of the baffle structure is the same with the surface of the floor of an inlet duct as shown in FIG. 3. Whereas the baffle structure 3 has a large baffle effect compared with guide vanes to be disposed at bend portion 2, it presents such a problem as the flow rate of an exhaust gas becomes slow at the side of inlet duct 1 (upper left side of the catalyst duct 6 shown in FIG. 3) due to the inertial force of the exhaust gas (see the distribution of gas flow rates shown in FIG. 3); and the solution of the problem was not yet attained.

Subject of the present invention is to prevent the occurrence of nonuniform gas flow distribution, that is, channeling caused by the inertial force of the exhaust gas in baffle structure 3 to be disposed at the inlet of catalyst duct 6 having catalyst layer 4 disposed therein, to supply an exhaust gas into catalyst layer 4 at a uniform flow rate, to enhance the efficiency of treating an exhaust gas in the catalyst layer 4 through the uniform supply of the exhaust gas, and to lengthen the catalyst life.

In order to achieve the subject described above, the present invention is summarized as follows:

(1) An apparatus for treating an exhaust gas, the apparatus comprising:
   (a) an inlet duct through which the exhaust gas is flowed in,
   (b) a bend portion, and
   (c) a catalyst duct connected to the inlet duct through the bend portion, and having a catalyst used for purifying the exhaust gas and disposed in the catalyst duct,
   the apparatus further having a baffle structure comprising plural baffle plates disposed at the inlet of the catalyst duct in the direction of the cross section of the catalyst duct,
   wherein the plural baffle plates are formed and arranged so that the heights of the baffle plates being first gradually increased from the inlet duct side to $L_1$ and then maintained constant from $L_1$ to $L_0$ when the distance from the extremity of the inlet duct side to the extremity of the bend portion was assumed to be $L_0$ and a prescribed distance in between was assumed to be $L_1$, respectively.

(2) The apparatus for treating an exhaust gas recited in paragraph (1) above wherein the height of a baffle plate satisfies the following equations (1) and (3) within the range of $0 \leq L \leq L_1$ and satisfies the following equations (2) and (3) within the range of $L_1 \leq L \leq L_0$:

$$H = L/L_1 \times h_1 + h_0 \text{ (for } 0 \leq L \leq L_1\text{)} \tag{1}$$

$$H = h_1 + h_0 \text{ (for } L_1 \leq L \leq L_0\text{)} \tag{2}$$

$$0 \leq L_1 \leq L_0/2 \tag{3}$$

wherein H is the height of an optional baffle plate,

L is the distance between the extremity of the inlet duct side and the optional baffle plate which stands apart from the extremity of the inlet duct side in the direction toward the extremity of the bend portion, in the baffle structure, $h_1$ is the distance between the bottom surface of the inlet duct and the upper end of the baffle plate positioned at the extremity of the bend portion, $h_0$ is the height of the baffle plate positioned at the extremity of the inlet duct side, $L_0$ is the distance between the extremity of the inlet duct side and the extremity of the bend portion in the baffle structure, and $L_1$ is the distance in which the heights of baffle plates are gradually increased from the extremity of the inlet duct side toward the extremity of the bend portion.

In the apparatuses of the present invention, the configuration of baffle plates which form a baffle structure may be a lattice-like, honeycomb-like, or any other shape so far as the baffle plates are arranged in the direction of the cross section of a catalyst duct at the inlet of the catalyst duct and the surfaces of each of the baffle plates are placed in parallel with the lengthwise direction of the catalyst duct as shown in the drawings. Catalyst layer in catalyst duct 6 in the apparatus of the present invention is not limited to a layer of a denitrating catalyst, and it may be a layer of a catalyst used for treating an exhaust gas containing hazardous halogen compounds such as dioxins, or a layer of another catalyst.

Figure 1:
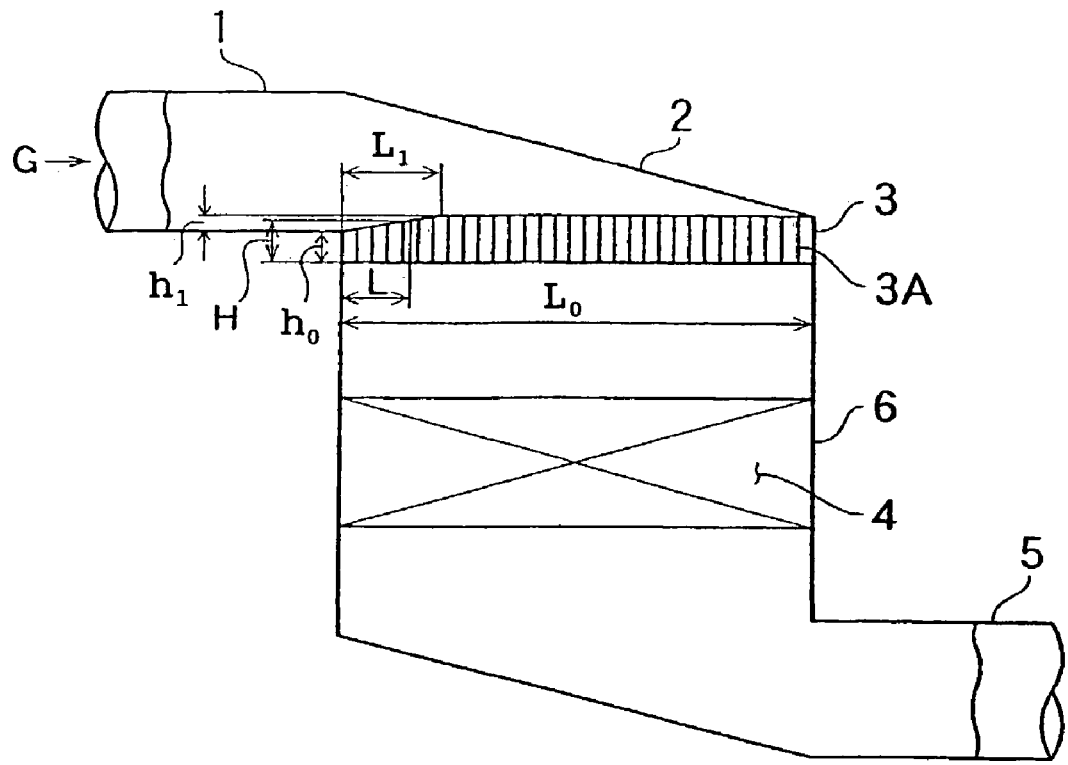
FIG. 1 is an illustration showing the structure in the vicinity of a denitrating device in an example of exhaust gas treating apparatuses of the present invention.

Explanation of symbols: Meanings of symbols in the drawings are as follows:

1 . . . inlet duct, 2 . . . bend portion, 3 . . . baffle structure, 4 . . . catalyst layer, 5 . . . outlet duct, 6 . . . catalyst duct, and G . . . exhaust gas.

BEST MODE FOR CARRYING OUT THE INVENTION

Now, the present invention will be described in more detail with reference to examples shown in the drawings. However, it should be understood that the scope of the present invention is by no means limited by such examples.

FIG. 1 is an illustration showing the structure near a denitrating device in an example of exhaust gas treating apparatuses of the present invention. This example of the apparatuses comprises inlet duct 1 through which exhaust gas G is flowed in, bend portion 2, catalyst duct 6 connected to the inlet duct through the bend portion and having layer 4 of a denitrating catalyst disposed therein, and baffle structure 3 comprising plural baffle plates 3A disposed at the inlet of the catalyst duct in the direction of the cross section of the catalyst duct. In this case, baffle plates 3A are arranged in a lattice-like configuration to form baffle structure 3. The baffle plates 3A in the baffle structure 3 are formed and arranged so that the height of a baffle plate satisfies the equations (1), (2), and (3) described above.

Figure 2:
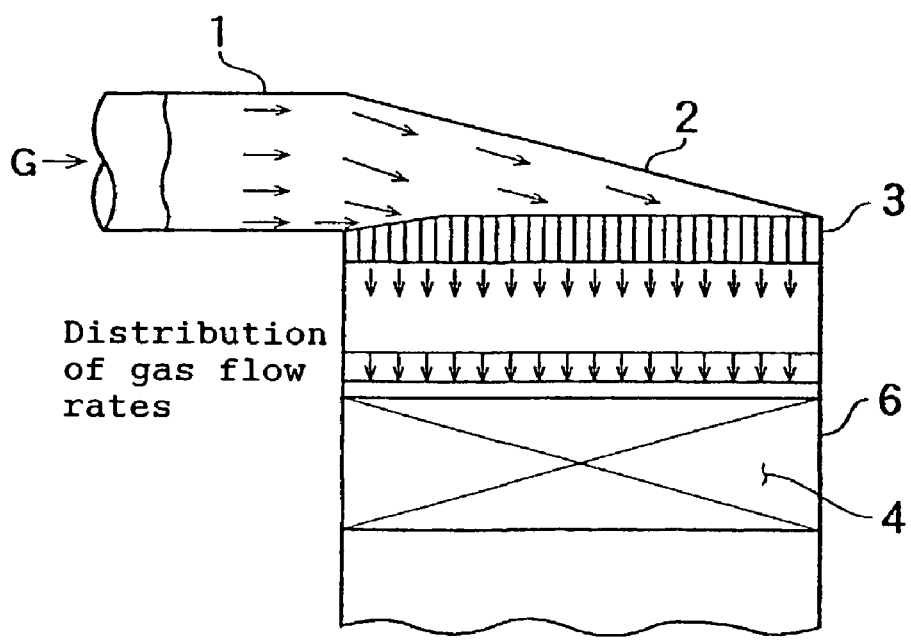
FIG. 2 is an illustration showing particularly the state of flow rate distribution of an exhaust gas in the apparatus shown in FIG. 1.
Figure 3:
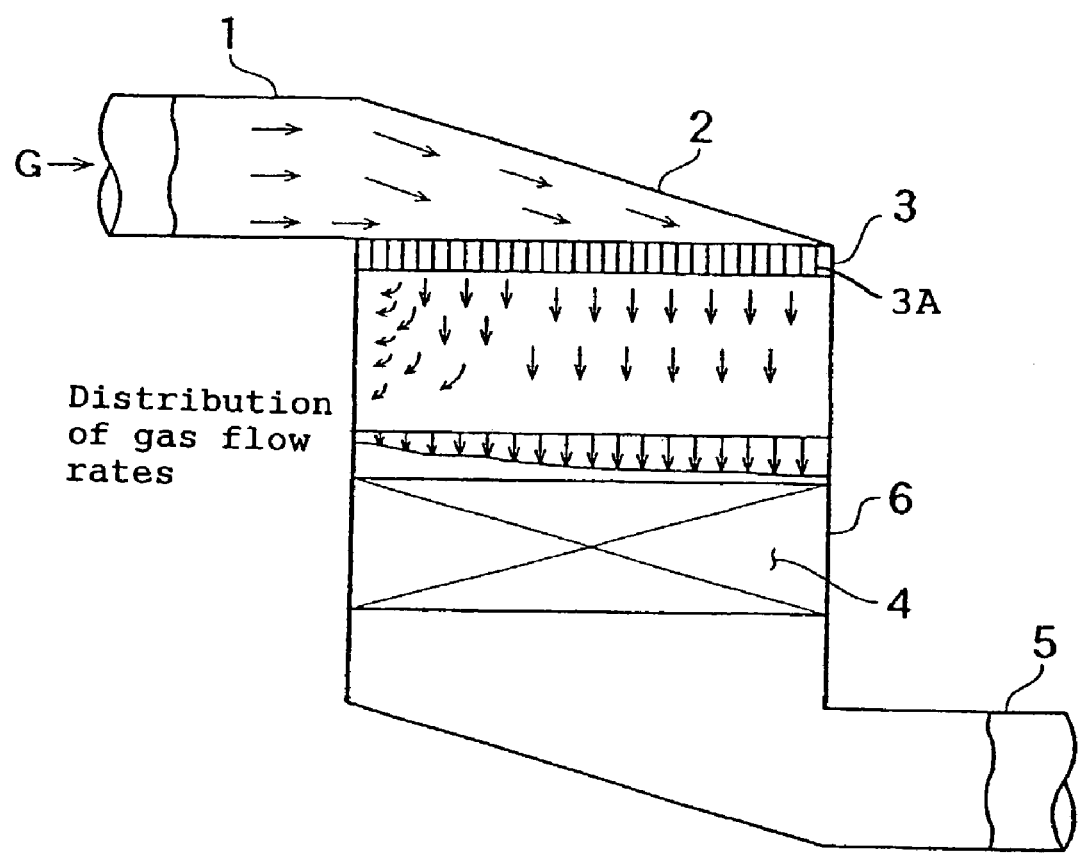
FIG. 3 is an illustration showing the structure in the vicinity of a denitrating device and the state of flow rate distribution of an exhaust gas in a conventional apparatus for treating an exhaust gas.

When an exhaust gas was flowed into each of the conventional apparatus shown in FIG. 3 and the apparatus of the present invention described above, and the flow conditions of the exhaust gas in those apparatuses were observed, respectively, it was found that in the conventional apparatus, i) the exhaust gas was hardly flowed into catalyst duct 6 at the side of inlet duct 1 (upper left side portion of the catalyst duct 6 shown in FIG. 3) since the level of the upper end of baffle structure 3 was the same with the end portion of the inlet of catalyst duct 6 (or the bottom surface of inlet duct 1), ii) a region in which the flow rate of the exhaust gas became slow occurred at a portion of the inlet of catalyst layer 4, and thus iii) the flow of the exhaust gas flowed into catalyst layer 4 became nonuniform as shown in FIG. 3; whereas in the apparatus of the present invention, a very uniform flow distribution of the exhaust gas was obtained at the inlet of catalyst layer 4 as shown in FIG. 2 since the exhaust gas became easy to flow into catalyst duct 6 at the side of inlet duct 1.

In order to confirm the effects of baffle structure 3 used in the apparatuses of the present invention, flow conditions of an exhaust gas in the apparatus of the present invention shown in FIG. 1 and the conventional apparatus shown in FIG. 3 were investigated, respectively. The results thus obtained are shown in Table 1. Coefficient of variation ($\xi$), maximum deviation ($\epsilon 1$), and minimum deviation ($\epsilon 2$) shown in the Table 1 are defined by the following equations:

$$\xi = \sigma/Va \times 100 \text{ (wherein "$\sigma$" is a standard deviation and "}Va\text{" is an average flow rate)} \quad (4)$$

$$\epsilon 1 = (\text{max} - Va)/Va \times 100 \text{ (wherein "max" is the value of the maximum flow rate)} \quad (5)$$

$$\epsilon 2 = (\text{min} - Va)/Va \times 100 \text{ (wherein "min" is the value of the minimum flow rate)} \quad (6)$$

TABLE 1

| Test No. | Test conditions | Coefficient of variation $\xi$ (%) | Maximum deviation $\epsilon 1$ (%) Minimum deviation $\epsilon 2$ (%) |
|---|---|---|---|
| 1 | Conventional technology | 18 | +50 −70 |
| 2 | Present invention | 9 | +40 −30 |

From the results shown in the Table 1 above, it was confirmed that the apparatus of the present invention is higher than the conventional technology in baffle effect.

INDUSTIAL APPLICABILITY

According to the present invention, it is possible to prevent the occurrence of channeling (nonuniform flow distribution) of an exhaust gas at the inlet of a catalyst layer and to lengthen the catalyst life, by gradually raising the positions of upper ends of baffle plates in a baffle structure, which is disposed at the inlet of a catalyst duct, from the inlet duct side toward the extremity of a bend portion.

The invention claimed is:
1. An apparatus for treating an exhaust gas, the apparatus comprising:
   (a) an inlet duct through which the exhaust gas is flowed in,
   (b) a bend portion, and
   (c) a catalyst duct connected to the inlet duct through the bend portion, and having a catalyst used for purifying the exhaust gas and disposed in the catalyst duct, the apparatus further having a baffle structure comprising plural baffle plates disposed at the inlet of the catalyst duct in the direction of the cross section of the catalyst duct, wherein the plural baffle plates are formed and arranged so that the heights of the baffle plates being first gradually increased from the extremity of the inlet duct side to $L_1$ and then maintained constant from $L_1$ to $L_0$ when the distance from the extremity of the inlet duct side to the extremity of the bend portion was assumed to be $L_0$ and a prescribed distance in between was assumed to be $L_1$, respectively.

2. The apparatus for treating an exhaust gas according to claim 1 wherein the height of a baffle plate satisfies the following equations (1) and (3) within the range of $0 \leq L \leq L_1$ and satisfies the following equations (2) and (3) within the range of $L_1 \leq L \leq L_0$:

$$H = L/L_1 \times h_1 + h_0 \text{ (for } 0 \leq L \leq L_1\text{)} \tag{1}$$

$$H = h_1 + h_0 \text{ (for } L_1 \leq L \leq L_0\text{)} \tag{2}$$

$$0 \leq L_1 \leq L_0/2 \tag{3}$$

wherein H is the height of an optional baffle plate,
- L is the distance between the extremity of the inlet duct side and the optional baffle plate which is apart from the extremity of the inlet duct side in the direction toward the extremity of the bend portion, in the baffle structure,
- $h_1$ is the distance between the bottom surface of the inlet duct and the upper end of the baffle plate positioned at the extremity of the bend portion,
- $h_0$ is the height of the baffle plate positioned at the extremity of the inlet duct side,
- $L_0$ is the distance between the extremity of the inlet duct side and the extremity of the bend portion in the baffle structure, and
- $L_1$ is the distance in which the heights of baffle plates are gradually increased from the extremity of the inlet duct side toward the extremity of the bend portion.

* * * * *